(12) United States Patent
Biteau et al.

(10) Patent No.: US 9,103,969 B2
(45) Date of Patent: Aug. 11, 2015

(54) CURABLE COATING COMPOSITION MODIFIED WITH A CLEAVABLE SURFACTANT FOR IMPROVING ADHESION IN MULTILAYERED COATING STACKS

(75) Inventors: John Biteau, St. Petersburg, FL (US); Herbert Mosse, Lutz, FL (US)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 0 days.

(21) Appl. No.: 12/922,136

(22) PCT Filed: Jun. 11, 2010
(Under 37 CFR 1.47)

(86) PCT No.: PCT/EP2010/058268
§ 371 (c)(1),
(2), (4) Date: Dec. 19, 2011

(87) PCT Pub. No.: WO2010/142798
PCT Pub. Date: Dec. 16, 2010

(65) Prior Publication Data
US 2012/0164458 A1      Jun. 28, 2012

Related U.S. Application Data

(60) Provisional application No. 61/186,122, filed on Jun. 11, 2009.

(51) Int. Cl.
| | | |
|---|---|---|
| G02B 1/10 | (2006.01) | |
| G02B 1/11 | (2006.01) | |
| B05D 3/10 | (2006.01) | |
| B05D 5/10 | (2006.01) | |

(52) U.S. Cl.
CPC .............. *G02B 1/105* (2013.01); *B05D 3/107* (2013.01); *B05D 5/10* (2013.01); *G02B 1/11* (2013.01)

(58) Field of Classification Search
CPC ............ B05D 3/107; B05D 5/10; G02B 1/11; G02B 1/105
See application file for complete search history.

(56) References Cited

U.S. PATENT DOCUMENTS

| | | | |
|---|---|---|---|
| 6,773,465 B1 * | 8/2004 | Murai et al. .................... | 8/471 |
| 7,022,861 B1 | 4/2006 | McElhanon et al. | |
| 7,074,936 B2 | 7/2006 | Caprioli et al. | |
| 7,351,837 B1 | 4/2008 | McElhanon et al. | |
| 2002/0136674 A1 * | 9/2002 | Vane .................... | 422/186.07 |
| 2006/0154173 A1 * | 7/2006 | Ishigaki et al. ............. | 430/270.1 |

FOREIGN PATENT DOCUMENTS

| | | |
|---|---|---|
| JP | 2003167334 | 6/2003 |
| JP | 2009108201 | 5/2009 |
| WO | WO 02/064945 | 8/2002 |
| WO | WO 2008/062142 | 5/2008 |

OTHER PUBLICATIONS

Thermally Cleavable Surfactants based on Diels-Alder Chemistry: Useful in a variety of applications that call for control of surface tension or require non-invasive removal techniques, Fact Sheet, Sandia National Laboratories, May 2005.*
Tehrani-Bagha et al., Cleavable Surfactants, Current opinion in colloid and interface science, vol. 12, No. 2, Jul. 26, 2007, pp. 81-91.*
Lin L H et al., Water-repellency and antibacterial activities of plasma-treated cleavable silicone surfactants on nylon fabrics, J.Surfcoat, vol. 2001, No. 3-4, Oct. 5, 2006, pp. 674-678.*
Silwet-212, Momentive, https://www.google.com/url?sa=t&rct=j&q=&esrc=s&source=web&cd=3&ved=0CEUQFjAC&url=http%3A%2F%2Fwww.momentive.com%2Fworkarea%2Fdownloadasset.aspx%3Fid%3D22591&ei=RIMSUu2vJpH64APMiYDwCg&usg=AFQjCNGWQztAjnjxwdUnTQTNsBdNngb6zQ&sig2=uQw8L_wp5SuYcJKRp1NoxQ&bvm=bv.50768961,d.dmg; last viewed Aug. 19, 2013.*
Hofrichter et al., Plasma treatment of polycarbonate for improved adhesion, J. Vac. Sci. Technol. A 20, 245, (2002).*
Plasmatech.inc, Ultra-pure Cleaning with Low Pressure Gas Plasma; 2007; found at http://www.plasmatechnology.com/pdf/PlasmaCleaningv2.pdf.*
Silwet L-77, http://www.sfm.state.or.us/CR2K_SubDB/MSDS/SILWET_L_77.PDF, last viewed Aug. 19, 2013.*
"Thermally Cleavable Surfactants based on Diels-Alder Chemistry: Useful in a variety of applications that call for control surface tension or require non-invasive removal techniques," Fact Sheet, Sandia National Laboratories, May 2005.

(Continued)

*Primary Examiner* — James M Mellott
(74) *Attorney, Agent, or Firm* — Norton Rose Fulbright US LLP

(57) ABSTRACT

The present invention is dedicated to a process for improving the adhesion properties between a first coating obtained from a curable composition and a second coating, through the incorporation of a cleavable surfactant in said curable composition and subsequent cleavage thereof. Said process comprises: depositing onto the substrate of an optical article a first layer of a first curable composition comprising at least one cleavable surfactant, curing at least partially said first curable composition, thereby forming a first coating, forming a second coating onto said first coating, wherein, after said first curable composition has been deposited onto the substrate, and before deposition of the second coating, said optical article is subjected to a treatment step resulting in a cleavage of at least a portion of the cleavable surfactant. Curable compositions containing cleavable surfactants and optical articles having deposited thereon stacks of coatings formed by the above process are also described.

7 Claims, No Drawings

(56) References Cited

OTHER PUBLICATIONS

Lin, et al., "Water-repellency and antibacterial activities of plasma-treated cleavable silicone surfactants on nylon fabrics," *Surface and Coatings Technology*, 201:674-8, 2006.

McElhanon et al., "Thermally cleavable surfactants based on Furan-Maleimide Diels-Alder adducts," *Langmuir*, 21:3259-3266, 2005.

PCT International Search Report and Written Opinion, issued in International Application No. PCT/EP2010/058268, dated Sep. 20, 2010.

Tehrani-Bagha, et al., "Cleavable surfactants," *Current Opinion in Colloid and Interface Science*, 12:81-91, 2007.

Office Action dated Dec. 2, 2014 for corresponding Japanese Application No. 2012514487 filed Jun. 11, 2010.

* cited by examiner

CURABLE COATING COMPOSITION MODIFIED WITH A CLEAVABLE SURFACTANT FOR IMPROVING ADHESION IN MULTILAYERED COATING STACKS

This application is a national phase application under 35 U.S.C. §371 of International Application No. PCT/EP2010/058268 filed 11 Jun. 2010, which claims priority to U.S. Provisional Application No. 61/186,122 filed on 11 Jun. 2009. The entire text of each of the above-referenced disclosures is specifically incorporated herein by reference without disclaimer.

BACKGROUND OF THE INVENTION

1. Field of the Invention

The present invention relates to a process for improving the adhesion properties between a first coating obtained from a curable composition and a second coating, through the incorporation of a cleavable surfactant in said curable composition and subsequent cleavage thereof. Curable compositions containing cleavable surfactants and optical articles having deposited thereon stacks of coatings formed by the above process are also described.

2. Description of Related Art

It is a common practice in the art to coat at least one main surface of a lens substrate, such as an ophthalmic lens or lens blank, with several coatings for imparting to the finished lens additional or improved optical or mechanical properties. These coatings are designated in general as functional coatings.

Thus, it is usual practice to coat at least one main surface of a lens substrate, typically made of an organic glass material, with successively, starting from the surface of the lens substrate, an impact-resistant coating (impact resistant primer), an abrasion- and/or scratch-resistant coating (hard coat), an antireflection coating and, optionally, an anti-smudge top coat. Other coatings such as a polarized coating, a photochromic coating or a dyeing coating may also be applied onto one or both surfaces of the lens substrate.

The typical formulation of a coating composition to be deposited by a wet route includes a surfactant that enhances the wettability of the surface to be coated and acts as a leveling agent. Actually, a coating composition may wet a surface unevenly and sag, which would result in thickness variations on the substrate. This is particularly true for aqueous sol-gel compositions. Including a surfactant in the composition provides a more evenly deposited coating.

However, when such surfactant-containing composition is spread and cured, the surfactant remains or migrates at the surface of the coating, resulting in a first coating which presents a low surface energy. When a second coating is applied onto said first coating, the applied coating composition does not spread correctly and/or, after curing, does not lead to adhesion between the two coatings.

This problem is traditionally solved by carrying out a preparation of the surface of the first coating before deposition of the second coating. A surface preparation is a treatment resulting in an increase of surface energy by surface physical attack and/or chemical modification. It consists in a chemical or physico-chemical attack by highly reactive species such as strong bases from alkaline solution or energetic species such as ions or radicals.

Such treatments usually activate the surface of the outermost layer of the optical article by altering the chemistry of a few outermost molecular layers. Good adhesion between two coatings generally requires strong interfacial forces via chemical compatibility and/or chemical bonding.

A surface preparation assists in creating chemically active functional groups (polar groups) at the surface of the coating, such as amine, carbonyl, hydroxyl and carboxyl groups, to improve interfacial adhesion. For instance, using an oxygen gas plasma may create hydroxyl functionality, thus increasing the wettability of the surface to be coated.

As a surface pre-treatment step, a high-frequency discharge plasma method, a glow discharge plasma method, a corona treatment, an electron beam method, an ion beam method, an acid or base treatment by using a concentrated solution and/or an immersion in such a solution can be employed.

However, a chemical or physico-chemical attack is difficult to control and to limit at the surfactant layer. It presents the risk of attacking more than the surface of the treated coating. For example, in the case of polysiloxane coatings, an alkaline attack is often used and it is well known that the chemical consequence of such treatment is a decrease of the subsurface cross-linking. In addition, surface preparation treatments raise safety problems (heated alkaline solution, corona . . . ) and increase the cost of the process (cost for surface preparation, operation and equipment) and its complexity, when a stack of several layers is needed.

Another solution to avoid obtaining a low surface energy coating is to employ a first coating composition devoid of surfactant. A careful choice of solvents is then needed to allow wettability and good spreading, because the wettability of a surface depends on the chemical nature of the surface material and the solvent choice strongly depends on the substrate and coating surface energy. In addition, this alternative solution is too restricting, since water based coating compositions can be hardly used.

SUMMARY OF THE INVENTION

The present invention has been made in view of the above problems, and it is an object of the present invention to provide a process for depositing a second coating onto the outermost coating of an optical article, without encountering adhesion troubles due to the presence of a surfactant in the latter coating composition, even if no activation or only a mild treatment of the surface of said coating is performed beforehand.

Other objects of the invention are to provide a surfactant containing coating formulation and an optical article coated with a surfactant containing coating both allowing to obtain good adhesion at the interface between said coating and another coating.

The present inventors have surprisingly found that the replacement of the traditional surfactant used in a curable coating composition by a specific type of surfactant allowed, after a specific treatment, the resulting coating to be coated with other layers with still a good adhesion between layers.

To achieve the foregoing objects, and in accordance with the invention as embodied and broadly described herein, the present invention relates to a process for preparing an optical article comprising:
(a) providing an optical article comprising a substrate having an exposed surface,
(b) depositing onto said exposed surface of the substrate a first layer of a first curable composition comprising at least one cleavable surfactant,
(c) curing at least partially said first curable composition, thereby forming a first coating,
(d) forming a second coating onto said first coating, and (e) obtaining an optical article comprising a substrate successively coated with said first coating and said second coating, said first coating adhering to said second coating,
wherein, after said first curable composition has been deposited onto the exposed surface of the substrate, and before step (d), said optical article is subjected to a treatment step resulting in a cleavage of at least a portion of the cleavable surfactant.

The cleavable surfactant used in the coating formulation can be used as a standard one for spreading and wetting properties. After spreading and at least partially curing the first coating, the surfactant is cleaved by a simple operation, which allows to improve the adhesion properties ("boundability") between said first coating and a second coating.

The implementation of the present process requires no modification of the original tweaking of the traditional process for depositing a curable coating composition, no modification of the deposition apparatus, and generally no various additional equipments.

The present invention also relates to an optical article comprising a substrate having a surface coated with an at least partially cured coating, wherein said coating has been obtained by:
depositing onto the surface of the substrate a first curable composition comprising at least one cleavable surfactant, and
at least partially curing said curable composition,
wherein said optical article has been subjected to a treatment step resulting in a cleavage of at least a portion of the cleavable surfactant after said curable composition has been deposited onto the surface of the substrate.

The invention further relates to a curable composition, which may be used in the above process, comprising at least one cleavable surfactant, and at least one compound of formula:

$$R_nSi(X)_{4-n} \quad (I)$$

or a hydrolyzate thereof, in which the R groups are identical or different and represent monovalent organic groups linked to the silicon atom through a carbon atom, the X groups are identical or different and represent hydrolyzable groups and n is an integer equal to 1 or 2.

Finally, the invention relates to the use of a cleavable surfactant in a curable composition to improve adhesion to another coating of the coating resulting from the cure of said curable composition.

Other objects, features and advantages of the present invention will become apparent from this description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION OF THE INVENTION AND PREFERRED EMBODIMENTS

The terms "comprise" (and any form of comprise, such as "comprises" and "comprising"), "have" (and any form of have, such as "has" and "having"), "contain" (and any form of contain, such as "contains" and "containing"), and "include" (and any form of include, such as "includes" and "including") are open-ended linking verbs. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, reaction conditions, etc. used herein are to be understood as modified in all instances by the term "about."

When the optical article comprises one or more surface coatings, the term "to deposit a layer onto the optical article" means that a layer is deposited onto the outermost coating of the optical article.

The optical article prepared according to the process of the present invention is a transparent optical article, preferably a lens, and more preferably an ophthalmic lens or lens blank. The process of the invention can be used for manufacturing optical articles coated on their convex main side (front side), concave main side (back side), or both sides.

Herein, the term "lens" means an organic or inorganic glass lens, comprising a lens substrate which may be coated with one or more coatings of various natures.

The substrate may be made of mineral glass or organic glass, preferably organic glass. The organic glasses can be either thermoplastic materials such as polycarbonates and thermoplastic polyurethanes or thermosetting (cross-linked) materials such as diethylene glycol bis(allylcarbonate) polymers and copolymers (in particular CR 39® from PPG Industries), thermosetting polyurethanes, polythiourethanes, polyepoxides, polyepisulfides, poly(meth)acrylates and copolymers based substrates, such as substrates comprising (meth)acrylic polymers and copolymers derived from bisphenol-A, polythio(meth)acrylates, as well as copolymers thereof and blends thereof. Preferred materials for the lens substrate are polycarbonates and diethylene glycol bis(allylcarbonate) copolymers, in particular substrates made of polycarbonate.

The optical article comprising a substrate used herein may also be a carrier onto which the first coating and the second coating are stored. They can be transferred later from the carrier onto the substrate of e.g. an optical lens. The carrier which may be coated according to the present process may optionally bear at least one functional coating. Obviously, the coatings are applied on the surface of the carrier in the reverse order with regard to the desired order of the coating stack on the lens substrate.

The surface of the article onto which the inventive first coating will be deposited may optionally be subjected to a pre-treatment step intended to improve adhesion, for example a high-frequency discharge plasma treatment, a glow discharge plasma treatment, a corona treatment, an electron beam treatment, an ion beam treatment, an acid or base treatment.

The first coating according to the invention may be deposited onto a naked substrate or onto the outermost coating layer of the substrate if the substrate is coated with surface coatings.

According to the invention, the optical article may comprise a substrate coated with various coating layers, chosen from, without limitation, an impact-resistant coating (impact resistant primer), an abrasion- and/or scratch-resistant coating (hard coat), a polarized coating, a photochromic coating, a dyeing coating, or several of those coatings.

As used herein, a "first coating" is intended to mean a coating which has been formed from a curable composition comprising a cleavable surfactant, which has been at least partially cured before deposition onto said coating of a subsequent coating, and which cleavable surfactant has to be at least partially cleaved before deposition of said subsequent coating. The curable composition can be made of any material and can be a cross-linkable composition.

The first coating may be a (meth)acrylate based coating, which is typically UV-curable. The term (meth)acrylate means either methacrylate or acrylate. The first coating may be especially obtained from a mixture of an acrylate and an epoxy monomer. Usable polyepoxy monomers are disclosed for example in US2007/0275171 and U.S. Pat. No. 6,984, 262, which are incorporated herein by reference.

The main component of the (meth)acrylate based curable coating composition may be chosen from monofunctional (meth)acrylates and multifunctional (meth)acrylates such as difunctional (meth)acrylates; trifunctional (meth)acrylates; tetrafunctional (meth)acrylates, pentafunctional(meth)acrylates, hexafunctional (meth)acrylates.

Examples of monomers which may be used as main components of (meth)acrylate based coating compositions are:
monofunctional (meth)acrylates: Allyl methacrylate, 2-ethoxyethyl acrylate, 2-ethoxyethyl methacrylate, caprolactone acrylate, isobornyl methacrylate, lauryl methacrylate, polypropylene glycol monomethacrylate.
difunctional (meth)acrylates: 1,4-butanediol diacrylate, 1,4-butanediol dimethacrylate, 1,6-hexanediol diacrylate, 1,6-hexanediol dimethacrylate, ethoxylated bisphenol A diacrylate, polyethylene glycol di(meth)acrylates such as polyethylene glycol diacrylate, tetraethylene glycol diacrylate, polyethylene glycol dimethacrylate, polyethylene glycol diacrylate, tetraethylene glycol diacrylate, tripropylene glycol diacrylate, neopentyl glycol diacrylate, tetraethylene glycol dimethacrylate, diethylene glycol diacrylate.
trifunctional (meth)acrylates: Trimethylolpropane trimethacrylate, Trimethylolpropane triacrylate, pentaerythritol triacrylate, ethoxylated trimethylolpropane triacrylate, trimethylolpropane trimethacrylate.
tetra to hexa(meth)acrylates: Dipentaerythritol pentaacrylate, pentaerythritol tetraacrylate, ethoxylated pentaerythritol tetraacrylate, pentaacrylate esters.

In one embodiment of the present invention, the first coating is a sol-gel coating. The term "sol-gel" refers to materials undergoing a series of reactions, including hydrolysis and condensation and going through the sol to gel transition. Typically, a metal compound, such as a metal alkoxide or metal salt, hydrolyzes to form a metal hydroxide. The metal hydroxides then condense in solution to form a hybrid organic/inorganic polymer. Under certain conditions, these polymers condense to form a network gel.

Preferred sol-gel first coatings are silicon based coatings, which may be obtained by curing a precursor composition containing silanes or hydrolyzates thereof. The sol-gel silicon based coating compositions of the present invention are homogeneous mixtures of a solvent, a silane and/or an organosilane, a cleavable surfactant and optionally a catalyst which are processed to form a coating suitable for optical application. The term "homogeneous" as used herein refers to a form which has a uniform or similar structure throughout and is given the ordinary meaning known to persons skilled in the art.

In a preferred embodiment of the invention, the first curable composition comprises at least one cleavable surfactant and at least one compound of formula:

$R_nSi(X)_{4-n}$ (I)

or a hydrolyzate thereof, in which the R groups are identical or different and represent monovalent organic groups linked to the silicon atom through a carbon atom, the X groups are identical or different and represent hydrolyzable groups and n is an integer equal to 1 or 2.

Organosilanes of formula I bear two or three X groups directly linked to the silicon atom, each leading to an OH group upon hydrolysis and one or two monovalent organic R groups linked to the silicon atom. It is worth noting that SiOH bonds may be initially present in the compounds of formula I, which are considered in this case as hydrolyzates. Hydrolyzates also encompass siloxane salts.

The X groups may independently and without limitation represent alkoxy groups —O—$R^1$, wherein Fe preferably represents a linear or branched alkyl or alkoxyalkyl group, preferably a $C_1$-$C_4$ alkyl group, acyloxy groups —O—C(O)$R^3$, wherein $R^3$ preferably represents an alkyl group, preferably a $C_1$-$C_6$ alkyl group, and more preferably a methyl or ethyl group, halogen groups such as Cl and Br, amino groups optionally substituted with one or two functional groups such as an alkyl or silane group, for example the $NHSiMe_3$ group, alkylenoxy groups such as the isopropenoxy group.

The X groups are preferably alkoxy groups, in particular methoxy, ethoxy, propoxy or butoxy, more preferably methoxy or ethoxy. In this case, compounds of formula I are alkoxysilanes.

In one embodiment of the invention, the silanes of formula I bear at least one R group containing at least one polymerizable function. Such silanes include, but are not limited to epoxysilanes, unsaturated organosilanes such as allylsilanes, vinylsilanes acrylic silanes, methacrylic silanes, preferably comprising a terminal ethylenic double bond.

Among compounds of formula I, a preferred class of compounds includes compounds of formula:

$R_nY_mSi(X)_{4-n'-m}$ (II)

or hydrolyzates thereof, in which the R groups are identical or different and represent monovalent organic groups linked to the silicon atom through a carbon atom, the Y groups are identical or different and represent monovalent organic groups linked to the silicon atom through a carbon atom and containing at least one epoxy function, the X groups are identical or different and represent hydrolyzable groups, m and n' are integers such that m is equal to 1 or 2 and n'+m=1 or 2.

The integers n and m define three groups of compounds II: compounds of formula $RYSi(X)_2$, compounds of formula $Y_2Si(X)_2$, and compounds of formula $YSi(X)_3$. Among these compounds, epoxysilanes having the formula $YSi(X)_3$ are preferred.

The monovalent R groups linked to the silicon atom through a Si—C bond are organic groups. These groups may be, without limitation, hydrocarbon groups, either saturated or unsaturated, preferably $C_1$-$C_{10}$ groups and better $C_1$-$C_4$ groups, for example an alkyl group, preferably a $C_1$-$C_4$ alkyl group such as methyl or ethyl, an aminoalkyl group, an alkenyl group, such as a vinyl group, a $C_6$-$C_{10}$ aryl group, for example an optionally substituted phenyl group, in particular a phenyl group substituted with one or more $C_1$-$C_4$ alkyl groups, a benzyl group, a (meth)acryloxyalkyl group, or a fluorinated or perfluorinated group corresponding to the above cited hydrocarbon groups, for example a fluoroalkyl or perfluoroalkyl group, or a (poly)fluoro or perfluoro alkoxy [(poly)alkyloxy]alkyl group.

Preferably, the R groups do not contain functions which are prone to react with the hydrolyzed silanes present in the first curable composition, and in particular with the SiOH and/or epoxy groups of those silanes which may be present. The most preferred R groups are alkyl groups, in particular $C_1$-$C_4$ alkyl groups, and ideally methyl groups.

The monovalent Y groups linked to the silicon atom through a Si—C bond are organic groups since they contain at least one epoxy function, preferably one epoxy function. By epoxy function, it is meant a group of atoms, in which an oxygen atom is directly linked to two adjacent carbon atoms or non adjacent carbon atoms comprised in a carbon containing chain or a cyclic carbon containing system. Among epoxy functions, oxirane functions are preferred, i.e. saturated three-membered cyclic ether groups.

The preferred Y groups are groups of formulae III and IV:

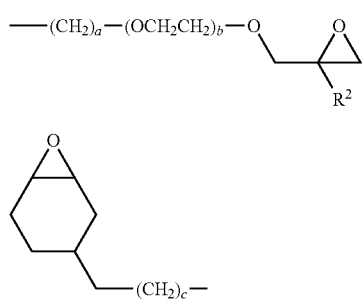

in which $R^2$ is an alkyl group, preferably a methyl group, or a hydrogen atom, ideally a hydrogen atom, a and c are integers ranging from 1 to 6, and b is 0, 1 or 2.

The preferred group having formula III is the γ-glycidoxypropyl group ($R^2$=H, a=3, b=0) and the preferred (3,4-epoxycyclohexyl)alkyl group of formula IV is the β-(3,4-epoxycyclohexyl)ethyl group (c=1). The γ-glycidoxyethoxypropyl group may also be employed ($R^2$=H, a=3, b=1).

Preferred epoxysilanes of formula II are epoxyalkoxysilanes, and most preferred are those having one Y group and three alkoxy X groups. Particularly preferred epoxytrialkoxysilanes are those of formulae V and VI:

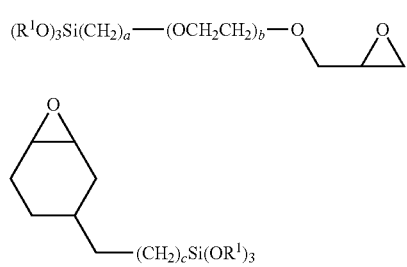

in which $R^1$ is an alkyl group having 1 to 6 carbon atoms, preferably a methyl or ethyl group, and a, b and c are such as defined above.

Examples of such epoxysilanes include but are not limited to glycidoxy methyl trimethoxysilane, glycidoxy methyl triethoxysilane, glycidoxy methyl tripropoxysilane, α-glycidoxy ethyl trimethoxysilane, α-glycidoxy ethyl triethoxysilane, β-glycidoxy ethyl trimethoxysilane, β-glycidoxy ethyl triethoxysilane, β-glycidoxy ethyl tripropoxysilane, α-glycidoxy propyl trimethoxysilane, α-glycidoxy propyl triethoxysilane, α-glycidoxy propyl tripropoxysilane, β-glycidoxy propyl trimethoxysilane, β-glycidoxy propyl triethoxysilane, β-glycidoxy propyl tripropoxysilane, γ-glycidoxy propyl trimethoxysilane, γ-glycidoxy propyl triethoxysilane, γ-glycidoxy propyl tripropoxysilane, 2-(3,4-epoxycyclohexyl)ethyltrimethoxysilane, 2-(3,4-epoxycyclohexyl)ethyltriethoxysilane. Other useful epoxytrialkoxysilanes are described in U.S. Pat. No. 4,294,950, U.S. Pat. No. 4,211,823, U.S. Pat. No. 5,015,523, EP 0614957 and WO 94/10230, which are hereby incorporated by reference. Among those silanes, γ-glycidoxypropyltrimethoxysilane (GLYMO) is preferred.

Preferred epoxysilanes of formula II having one Y group and two X groups include but are not limited to epoxydialkoxysilanes such as γ-glycidoxypropyl-methyl-dimethoxysilane, γ-glycidoxypropyl bis(trimethylsiloxy)methylsilane, γ-glycidoxypropyl-methyl-diethoxysilane, γ-glycidoxypropyl-methyl-diisopropenoxysilane, and γ-glycidoxyethoxypropyl-methyl-dimethoxysilane. When epoxy dialkoxysilanes are used, they are preferably combined with epoxytrialkoxysilanes such as those described above, and are preferably employed in lower amounts than said epoxytrialkoxysilanes.

Other preferred compounds of formula I having one R group and three X groups include but are not limited to methyl triethoxysilane (MTEOS), allyltrimethoxysilane, allyltriethoxysilane, allyltris(trimethylsiloxy)silane, 3-mercaptopropyl trimethoxysilane, 3-mercaptopropyl triethoxysilane, n-phenylaminopropyl trimethoxysilane, vinyltrisisobutoxysilane, vinyltris(2-methoxyethoxy) silane, vinyltriisopropoxysilane, vinyltri-tert-butoxysilane, vinyltriphenoxysilane, vinyldimethoxyethoxysilane, vinyl-triacetoxysilane, vinylbis (trimethylsiloxy) silane vinyltriethoxysilane, vinyltrimethoxysilane, 3-acryloxypropyltris (trimethylsiloxy) silane, 3-acryloxypropyl-trimethoxysilane, N-(3-acryloxy-2-hydroxypropyl)-3-aminopropyl-triethoxysilane, 3-methacryloxypropyltris (vinyldimethoxylsiloxy) silane, 3-methacryloxypropyltris(trimethylsiloxy) silane, 3-methacryloxypropyltris(methoxyethoxy) silane, 3-methacryloxypropyl-trimethoxysilane, 3-methacryloxypropenyl-trimethoxysilane, ureidomethyl trimethoxysilane, ureidoethyl trimethoxysilane, ureidopropyl trimethoxysilane, ureidomethyl triethoxysilane, ureidoethyl triethoxysilane, ureidopropyl triethoxysilane, 3-amino propyl triethoxy silane, 3-(2-amino ethyl)-3-amino propyl trimethoxy silane, 3-(2-amino ethyl)-3-amino propyl triethoxy silane, p-aminophenylsilane, 3-aminopropyl trimethoxysilane, amino ethyl triethoxysilane.

Other preferred compounds of formula I having two R groups and two X groups include but are not limited to dimethyldiethoxysilane (DMDES), vinylmethyldiethoxysilane, vinylmethyl diacetoxysilane, 3-acryloxypropylmethyl-dimethoxysilane, 3-acryloxypropyl-methyl bis(trimethylsiloxy) silane, 3-methacryloxypropyl-methyldimethoxysilane, 3-methacryloxypropyl-methyl-diethoxysilane, 3-methacryloxypropylbis(trimethylsiloxy) methylsilane, methacryloxymethyl bis(trimethylsiloxy)methylsilane, 3-amino propyl methyl dimethoxy silane, 3-(2-amino ethyl)amino propyl methyl dimethoxy silane, 3-amino propyl methyl diethoxysilane.

In another embodiment, the first curable composition comprises at least one cleavable surfactant and at least one compound of formula:

$$M(Z)_x \qquad (VII)$$

or a hydrolyzate thereof, in which M is a metal or metalloid, the Z groups are identical or different and represent hydrolyzable groups or hydrogen atoms, with the proviso that the Z groups do not all represent a hydrogen atom, and x is the valence of the metal or metalloid M.

The Z groups may represent hydrolyzable groups independently chosen from the hydrolyzable groups which have been previously cited when describing the X groups. It is worth noting that M—OH bonds may be initially present in the compounds of formula VII, which are considered in this case as hydrolyzates. Hydrolyzates also encompass metal or metalloid salts.

Preferred compounds of formula VII are metal or metalloid alkoxides and chlorides, ideally alkoxides $M(OR)_x$ wherein the R groups are independently an alkyl groups, usually having 1-6 carbon atoms, such as ethyl, propyl, isopropyl, sec-butyl or butyl, and x is as defined above.

M represents a metal or metalloid, which valence x preferably ranges from 2 to 6. Preferably, compounds of formula VII are tetravalent species (x=4). M atoms include but are not limited to metals such as Sn, Al, B, transition metals such as Zr, Hf, Sc, Nb, V, Y, Ba, Cr, Ta, W or Ti or metalloids such as silicon or germanium. M is more preferably silicon, zirconium, aluminum or titanium, and ideally silicon.

Most preferred compounds of formula VII having formula $Si(Z)_4$ are those in which the Z groups are hydrolyzable groups which are identical or different. Examples of such compounds are tetraalkoxysilanes such as tetraethoxysilane $Si(OC_2H_5)_4$ (TEOS), tetramethoxysilane $Si(OCH_3)_4$ (TMOS), tetra(n-propoxy)silane, tetra(i-propoxy)silane, tetra(n-butoxy)silane, tetra(sec-butoxy)silane or tetra(t-butoxy)silane, preferably TEOS.

Examples of other compounds of formula VII which may be used are zirconium compounds, preferably zirconium alkoxides such as zirconium n-propoxide, aluminum compounds, preferably aluminum alkoxides such as aluminum-sec-butoxide and aluminum isopropoxide, titanium compounds, preferably tetra-alkyl titanates such as titanium tetra-ethoxide, titanium tetra-isopropoxide, tantalum alkoxides, trimethylborate, barium acetate and mixtures thereof.

The first curable composition may comprise mixtures of any number of the above cited silanes, or mixtures of those silanes and compounds of formula VII. For example, said composition can comprise a mixture of (meth)acrylate compounds free of silicon atom, such as described above, and (meth)acrylic silanes, such as (meth)acryloxysilanes.

Silanes present in the first curable composition may be hydrolyzed partially or totally, preferably totally. Hydrolyzates can be prepared in a known manner, e.g. such as disclosed in FR 2702486 and U.S. Pat. No. 4,211,823. Hydrolysis catalysts such as hydrochloric acid or acetic acid may be used to promote the hydrolysis reaction over the condensation reaction.

In some embodiments, the first curable composition comprises fillers, generally nanoparticles, for increasing the hardness and/or the refractive index of the cured coating. The nanoparticles may be organic or inorganic. A mixture of both can also be used. Preferably, inorganic nanoparticles are used, especially metallic or metalloid oxide, nitride or fluoride nanoparticles, or mixtures thereof.

Suitable inorganic nanoparticles are for example nanoparticles of aluminum oxide $Al_2O_3$, silicon oxide $SiO_2$, zirconium oxide $ZrO_2$, titanium oxide $TiO_2$, antimony oxide $Sb_2O_5$, tantalum oxide $Ta_2O_5$, zinc oxide, tin oxide, indium oxide, cerium oxide, $Si_3N_4$, $MgF_2$ or their mixtures. It is also possible to use particles of mixed oxides. Using different types of nanoparticles allows making hetero-structured nanoparticles layers. Preferably, the nanoparticles are particles of aluminum oxide, zirconium oxide or silicon oxide $SiO_2$, more preferably $SiO_2$ nanoparticles. Mineral fillers are preferably used under colloidal form, i.e. under the form of thin particles, which diameter (or longest dimension) is lower than 1 µm, preferably lower than 150 nm and still better lower than 100 nm, dispersed in a dispersing medium such as water, an alcohol, a ketone, an ester or mixtures thereof, preferably an alcohol.

The first curable composition optionally comprises a catalytic amount of at least one curing catalyst, so as to accelerate the curing step. Examples of curing catalysts are photo-initiators that generate free radicals upon exposure to ultraviolet light or heat such as organic peroxides, azo compounds, quinones, nitroso compounds, acyl halides, hydrazones, mercapto compounds, pyrylium compounds, imidazoles, chlorotriazines, benzoin, benzoin alkyl ethers, diketones, phenones, and mixtures thereof.

When silicon-containing compositions are employed, for instance compositions comprising epoxysilanes, a curing catalyst such as aluminum acetylacetonate, a hydrolyzate thereof or carboxylates of metals such as zinc, titanium, zirconium, tin or magnesium may be used. Condensation catalysts such as saturated or unsaturated polyfunctional acids or acid anhydrides may also be used, in particular maleic acid, itaconic acid, trimellitic acid or trimellitic anhydride. Numerous examples of curing and/or condensation catalysts are given in "Chemistry and Technology of the Epoxy Resins", B. Ellis (Ed.) Chapman Hall, New York, 1993 and "Epoxy Resins Chemistry and Technology" 2' edition, C. A. May (Ed.), Marcel Dekker, New York, 1988.

In general, the catalysts described above are used according to the invention in an amount ranging from 0.01 to 10%, preferably from 0.1 to 5% by weight based on the total weight of the first curable composition.

The first curable composition according to the invention may also contain various additives conventionally used in polymerizable compositions, in conventional proportions. These additives include stabilizers such as antioxidants, UV light absorbers, light stabilizers, anti-yellowing agents, adhesion promoters, dyes, photochromic agents, pigments, rheology modifiers, lubricants, cross-linking agents, photo-initiators fragrances, and deodorants.

The remainder of the first curable composition is essentially comprised of solvents. In the case of sol-gel compositions, solvents may be chosen from water or water-miscible alcohols, essentially ethanol, or mixtures of water and water-miscible alcohols.

Once the first curable composition according to the invention has been prepared, it is deposited onto at least part of a main face of the substrate of the optical article, preferably onto said entire main face, by any of the methods used in coating technology such as, for example, spray coating, spin coating, flow coating brush coating, dip coating or roll-coating. Spin coating is the preferred method. The composition can be applied by a series of successive layers or thin coats onto the substrate to achieve the desired thickness.

The first curable composition is then at least partially cured during step (c) of the inventive process, before deposition of the second coating.

Depending upon the nature of the first curable composition, thermal curing, photo-curing with ultraviolet or visible light, or a combination of thermal and photo-curing can be used. Thermal curing can be performed under ambient conditions, such as by drying. To speed the manufacturing process, the curable composition can be cured under elevated temperatures. Heat curing may be accomplished by using a heat gun, an oven, heat lamps or other suitable methods to achieve the desired first coating. Cure times depend on the coating thickness.

In the case when the inventive first coating is not completely cured following step (c) of the inventive process, complete curing of said coating can be achieved during the curing step of another coating to be subsequently deposited onto the substrate, e.g. the "second coating," or during an additional curing step. It may be performed at any time after step (c) of the process according to the invention.

The specific choice of the first curable coating formulation may be determined based on the desired application. Said first coating is preferably an abrasion- and/or scratch-resistant coating or a layer of an antireflection coating.

In a first preferred embodiment of the invention, the first coating is an abrasion- and/or scratch-resistant coating. By definition, an abrasion- and/or scratch-resistant coating is a coating which improves the abrasion- and/or scratch-resistance of the finished optical article as compared to a same optical article but without the abrasion- and/or scratch-resistant coating. Typical formulations for abrasion- and/or scratch-resistant coating compositions described in the literature include a surfactant. According to the invention, any known optical abrasion- and/or scratch-resistant coating composition is advantageously modified by replacing the classical surfactant by a cleavable surfactant.

Preferred abrasion- and/or scratch-resistant first coatings are silicon-containing coatings and (meth)acrylate based coatings. Such coatings have been described above.

A particularly preferred first curable composition for an abrasion- and/or scratch-resistant coating comprises a cleavable surfactant, a hydrolyzate of an epoxytrialkoxysilane and dialkyldialkoxysilane, colloidal mineral fillers and a catalytic amount of an aluminum-based curing catalyst, the remaining of the composition being essentially comprised of solvents typically used for formulating abrasion- and/or scratch-resistant compositions. Typical ingredients other than the cleavable surfactant, which may be used in such abrasion- and/or scratch-resistant coating composition, are disclosed in French patent application FR 2702486, which is incorporated herein by reference. Especially preferred silicon based abrasion- and/or scratch-resistant coating compositions are those comprising as the main constituents a cleavable surfactant, a hydrolyzate of γ-glycidoxypropyl-trimethoxysilane (GLYMO) and dimethyl-diethoxysilane (DMDES), colloidal silica and a catalytic amount of aluminum acetylacetonate.

In a second preferred embodiment of the invention, the first coating is a layer of an antireflection coating. An antireflection coating is defined as a coating, which improves the anti-reflective properties of an optical article when deposited at its surface. It reduces reflection of light at the interface article-air on a relatively wide band of the visible spectrum. Antireflection coatings are well known and classically comprise a stack of one of several layers of materials. It is also well known that antireflection coatings preferably are multi-layer coatings comprising alternatively at least high refractive index layers (HI) and low refractive index layers (LI), and optionally, medium refractive index (MI), high refractive index and low refractive index (LI) layers. The high refractive index layer (HI) can be concomitantly an abrasion- and/or scratch-resistant coating.

The invention is particularly suited to the preparation of sol-gel antireflection (AR) layers, which are AR layers formed by means of the sol-gel approach. Layers of AR coatings are traditionally deposited under vacuum process, such as sputtering or chemical vapor deposition. Using a wet deposition method of the AR layers, such as dip or spin coating, is an alternative process which allows to operate under milder conditions. Sol-gel AR coating have been described in U.S. Patent Application No. 2006275627 and U.S. Pat. Nos. 5,698,266, 5,476,717, 4,361,598, 4,271,210 and 4,929,278, which are hereby incorporated by reference.

According to the invention, sol-gel AR layers can be formed from a liquid curable composition comprising at least one cleavable surfactant, mineral oxides (or chalcogenides) of high or low refractive index under a colloidal form, i.e. nanoparticles of mineral oxide which diameter (or longest dimension) is lower than 1 μm, preferably lower than 150 nm and still better lower than 100 nm, dispersed in a dispersing medium such as water, an alcohol, a ketone, an ester or mixtures thereof, preferably an alcohol. Said curable composition may also comprise a binder. In the case of an organic binder, the resulting layer comprises an organic-inorganic hybrid matrix, typically a silane-based matrix, in which colloidal materials are dispersed, that allow to adjust the refractive index of said layer.

The colloidal composition of mineral oxides can be synthesized from a molecular precursor preferably chosen from compounds of formula VII, such as metal or metalloid alkoxides of formula $M(OR)_x$, wherein M and x have been previously defined.

Sol-gel AR layers can also be formed by direct hydrolysis and condensation of a mixture of at least one compound of formula VII and at least one binder, for example an organic binder of formula I, contained in a composition comprising at least one cleavable surfactant.

An example of sol-gel HI antireflection layer is a $TiO_2$ coating formed from the hydrolysis of a tetra-alkyl titanate. An organic-inorganic hybrid matrix may also be obtained from the hydrolysis and condensation of at least one binder precursor, such as a compound containing an epoxy or (meth)acryloxy group and at least two functions hydrolyzable to silanol groups, for example γ-glycidoxypropyl trimethoxysilane, and at least one high refractive index colloidal metal oxide such as $TiO_2$.

Examples of sol-gel LI antireflection layers are disclosed in US 2006/0275627.

The process according to the invention may be used to prepare optical articles which are not limited to articles comprising only one "first coating" according to the invention. It may be employed to manufacture articles comprising several coatings formed from a curable composition comprising a cleavable surfactant which has been cleaved before deposition onto said first coating of a subsequent coating. The present process may be used each time a coating formed from a curable composition has to be coated with a subsequent coating, where adhesion of both coatings to one another is an issue.

In particular, the process according to the invention may be employed to form more than one sol-gel AR layer of a multilayer antireflection coating. Preferably, all AR layers of said multilayer antireflection coating are obtained from the sol-gel approach modified according to the teachings of the invention.

In the final optical article, thickness of the first coating, which is in a cured state, typically ranges from 1 nm to 30 μm, preferably from 5 nm to 15 μm.

In one embodiment of the invention, the thickness of said first coating in the final optical article preferably ranges from 1 to 15 μm, more preferably from 1 to 10 μm and even better from 1 to 4 μm. This embodiment is preferred when said first coating is, for example, an abrasion- and/or scratch-resistant coating.

In another embodiment of the invention, the thickness of said first coating in the final optical article preferably ranges from 5 to 250 nm, more preferably from 20 to 180 nm and even better from 45 to 160 nm. This embodiment is preferred when said first coating is, for example, a layer of an antireflection coating.

The cleavable surfactant contained in the first curable composition will now be described. Over the past decade, the development of cleavable surfactants has been a growing field in surfactant science. Cleavable surfactants have been notably described in U.S. Pat. No. 7,410,934, U.S. Pat. No. 7,351,837, U.S. Pat. No. 7,022,861, U.S. Pat. No. 7,074,936, U.S. Pat. No. 6,429,200, US 2006/254774, WO 02/064945, and in McElhanon, J. R.; Zifer, T.; Jamison, G. M.; Rahimian, K.; Long, T. P.; Kline, S. R.; Loy, D. A.; Wheeler, D. R.; Simmons, B. A. *Langmuir* 2005, 21, 3259-3266, in "Novel Surfactants," Holmberg, K. Ed., Marcel Dekker Inc., New York 1998, 115-138 and 333-358, in "Thermally and Photochemically Cleavable Surfactants," Charney, R.; Thomas, C.; Pollet, P.; Weikel, R.; Jessop, P.; Liotta, C., Eckert, C. A. 231$^{st}$ National ACS Meeting, Atlanta, Ga., March 2006, and references cited therein.

A surfactant refers to a compound that contains a polar group (hydrophilic) and a non-polar group (hydrophobic) within the same molecule that reduces surface tension in water. The expressions "cleavable surfactant", "degradable surfactant", "switchable surfactant", or "labile surfactant" refer to a surfactant which interfacial properties (detergent properties and surface activity) are able to be altered, preferably destroyed, by any process, such as bond cleavage or chemical modification of the polar and/or non-polar group, or both. For example, the polar group of the surfactant may be converted into a less polar or non polar group.

Examples of cleavable surfactants are those in which the polar group may be separated from the non-polar group by the removal of a chemical bond located between the two groups, such that the interfacial properties and surface activity of the surfactant are destroyed. Cleavable surfactant of this category generally comprise at least one weak chemical bond, which is capable of being broken under appropriate conditions, e.g. temperature and/or pH, to produce oil soluble and water soluble products typically having no interfacial properties and surface activity compared with the original surfactant molecule. Preferably, neither of the cleavage products possesses surface active character.

Cleavable surfactants also comprise those that may undergo a chemical modification resulting in a change and/or loss of surface-active behavior without fragmentation of the parent molecule. This can be accomplished by a number of chemical modifications including, but not limited to, dimerization, isomerization, acylation, alkylation, elimination, for example elimination of a polar head group such as an ammonium group, reduction or oxidation, of an amine (or its salt), alcohol, diol or carboxylic acid groups, or by a multistep process in which several chemical modifications are conducted.

Cleavable surfactants may be cleaved, without limitation, hydrolytically, e.g. with an appropriate amount of acid or base, with fluoride ion, thermally, photo-chemically, e.g. with UV light, or with a combination of several of these methods.

Preferably, the cleavage of the surfactant is an irreversible process. The term "irreversible," as used herein, means that the cleavable surfactant should degrade during a specific treatment step, but should not reconstitute or reform in situ after degradation.

A preferred class of cleavable surfactants includes those having the general formula VIII:

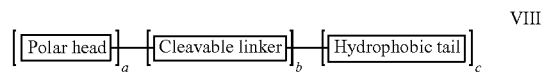

in which the polar head is a polar moiety, the hydrophobic tail is a hydrophobic moiety, a is an integer preferably ranging from 1 to 4, more preferably from 1 to 2, c is an integer preferably ranging from 1 to 4, more preferably from 1 to 2, and b is an integer preferably ranging from 1 to 10, more preferably 1 to 4, and better from 1 to 2. The polar heads, cleavable linkers and hydrophobic tails may be respectively identical or different from each other within the same molecule. The above cleavable surfactants comprise at least one polar head, at least one cleavable linker and at least one hydrophobic tail. In a preferred embodiment of the invention, a=b=c=1. However, cleavable surfactants such that (a, b, c)=(1, 2, 1) or (a, b, c)=(2, 1, 1) or (a, b, c)=(1, 1, 2) may also be useful, in particular those having more than one cleavable linker.

The above general formula also encompasses the case when a polar head and a cleavable linker, or a hydrophobic tail and a cleavable linker, are not clearly structurally distinguishable. According to this embodiment, the cleavable surfactant comprises a cleavable polar head and/or a cleavable hydrophobic tail.

The hydrophobic tail and polar head are any of the head and tail groups known to the surfactant science arts, and which are compatible with being joined to the cleavable linker.

The polar head of the cleavable surfactant typically comprises one or more hydrophilic groups. The meaning of a "hydrophilic group" is known in the art and generally means a chemical group that is readily soluble in an aqueous environment, and hydrogen bond donor and/or acceptor. The hydrophilic groups may be positively charged, negatively charged, zwitterionic or neutral, giving rise respectively to cationic, anionic, amphoteric or non ionic surfactants.

Examples of hydrophilic groups include the following chemical moieties: carboxy, sulfite, sulfate, sulfonate, phosphate, phosphonate, thiol salt, phenol salt, amino acid optionally under a zwitterionic form, phosphonium, quaternary ammonium, sulfosuccinate ester, amine oxide, glycol, alkanolamine, pyrrolidone, cinnamic acid, sinapinic acid, dihydroxybenzoic acid, aliphatic or aromatic hydroxyl, carbohydrate, such as a glucopyranosyl head (which is acid cleavable), polyethylene glycol, peptide, oligonucleotide, alkoxy amide, amine salt, pyridinium. The cleavable surfactants may comprise one or more of the above cited groups.

Some of these groups may be employed under their neutral or ionic form (e.g. carboxylic acid or carboxylate salt). In the case of ionic surfactants, the soluble salt can be prepared beforehand or formed in situ in the first curable composition by dissolving the non ionic precursor under appropriate conditions. Anionic groups are employed with a suitable cation, for example alkali metal ions such as potassium or sodium. Cationic groups are employed with a suitable anion, for example halide, perchlorate, nitrate, sulfate, or carbonate ions.

The polar head may be monomeric, oligomeric or polymeric. Examples of hydrophilic polymeric heads include poly(alkylene glycols), poly(vinyl pyrrolidone), poly(alcohols) (e.g., poly(vinyl alcohols)), poly(acids) (e.g., poly(acrylic acid)), poly(amides) (e.g., poly(N,N-dimethylacrylamide)), and combinations and copolymers thereof. Other examples of such polymeric polar heads are disclosed in US 2006/254774.

The hydrophobic tail of the cleavable surfactant typically comprises one or more hydrophobic groups. The meaning of a "hydrophobic group" is known in the art and generally refers to a chemical group that is not intrinsically soluble in an aqueous environment, and tends not to form hydrogen bonds.

The hydrophobic tail is usually a linear or branched hydrocarbon chain which is either fully saturated or partially unsaturated. It is preferably an alkyl chain, with or without branching, having preferably from 4 to 24 carbon atoms and preferably from 6 to 18 carbon atoms. Said alkyl chain may comprise alkenyl and/or alkynyl groups. In certain embodiments, the hydrophobic tail is an aliphatic group with 4 to 8 carbons or comprises an aromatic group. Most preferred hydrophobic tails are alkyl straight chains, e.g. oleyl, erucyl or dodecyl groups.

The hydrophobic tail may be monomeric, oligomeric or polymeric. Examples of hydrophobic polymeric tails include polyester, poly(caprolactones), poly(hydroxybutyrates), polyether esters, polyester amides, polyester carbonates, polyester urethanes, and combinations and copolymers thereof. Other examples of such polymeric hydrophobic tails are disclosed in US 2006/254774.

The polar head and the hydrophobic tail are connected by at least one cleavable linker, i.e. a linking group that can be cleaved under certain conditions, thus altering, preferably destroying the ability of the compound to act as a surfactant. Cleavage of the cleavable linker can be accomplished with any of the cleavage techniques cited above. Depending on the cleavable linker nature, this can lead or not to fragmentation of the parent molecule into at least two fragments having no surface active properties.

The cleavable linker may be monomeric, oligomeric or polymeric, i.e. may comprise a series of repeating units of cleavable groups.

In one embodiment of the invention, said linker comprises a weak, breakable chemical group or bond or a group that can be transformed into a group prone to be subsequently broken.

Examples of chemically cleavable linkers leading to fragmentation of the initial surfactant molecule are those containing groups such as cyclic acetal or ketal (e.g. 1,3-dioxolane, 1,3-dioxane), non cyclic acetal or ketal, which are generally acid cleavable, such as those disclosed in U.S. Pat. No. 7,074,936 and WO 02/064945, anhydrides, ester groups such as those disclosed in WO 02/064945, which are preferably cleaved under alkaline conditions, esters derived from naturally occurring sugars, thioester, orthoester, esteramide, ester ether, ester carbonate, ester urethane, amide groups, which are preferably cleaved under alkaline conditions, such as those disclosed in WO 02/064945, azo, quaternary hydrazonium, ether, the methylene dioxy linker, which is cleaved in acidic medium and generates two molecules of alcohol and one molecule of formaldehyde, such as disclosed in U.S. Pat. No. 7,074,936, disulfide groups, which may be cleaved with an acid, base or reducing agent (for example, dithiothreitol, β-mercaptoethanol, hydrogen sulfide, sodium hydrosulfide), such as those disclosed in U.S. Pat. No. 6,429,200 and U.S. Pat. No. 7,074,936.

Some surfactants are able to undergo cleavage without added chemical reagent, which is very useful in those applications where a neutral pH is required.

Preferred cleavable surfactants are thermally and/or photocleavable, more preferably thermally cleavable.

A preferred class of surfactants includes those of formula VIII which are thermally cleavable. Surfactants which may be cleaved through a retro Diels-Alder reaction are the most preferred ones. Such surfactants are Diels-Alder adducts that dissociate into a diene and a dienophile upon heating at a temperature preferably ranging from 50 to 150° C., more preferably from 60 to 120° C.

Preferred Diels-Alder adducts type surfactants are compounds of general formula IX and X:

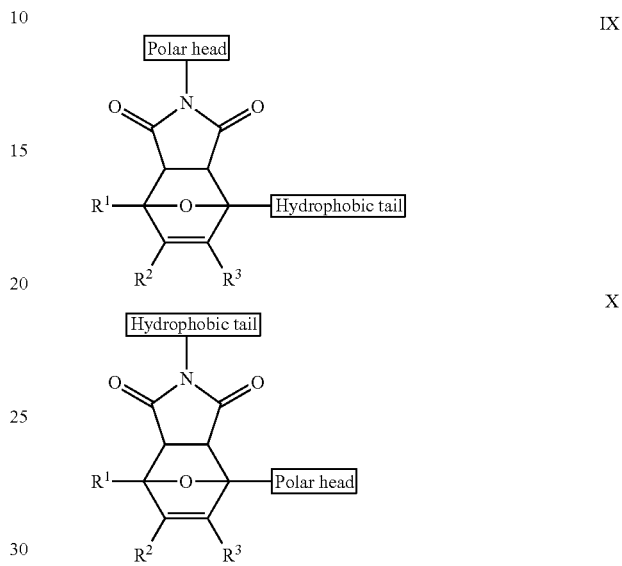

in which the polar head is a polar moiety (polar heads have been defined above), the hydrophobic tail is a hydrophobic moiety (hydrophobic tails have been defined above), $R^1$, $R^2$ and $R^3$ independently represent H, aryl, alkyl, halogen, a hydrophobic tail or a polar head or any other group compatible with the conditions of a Diels-Alder cycloaddition reaction. Compounds of formula IX and X respectively dissociate into precursors IXa, IXb and Xa, Xb, upon heating:

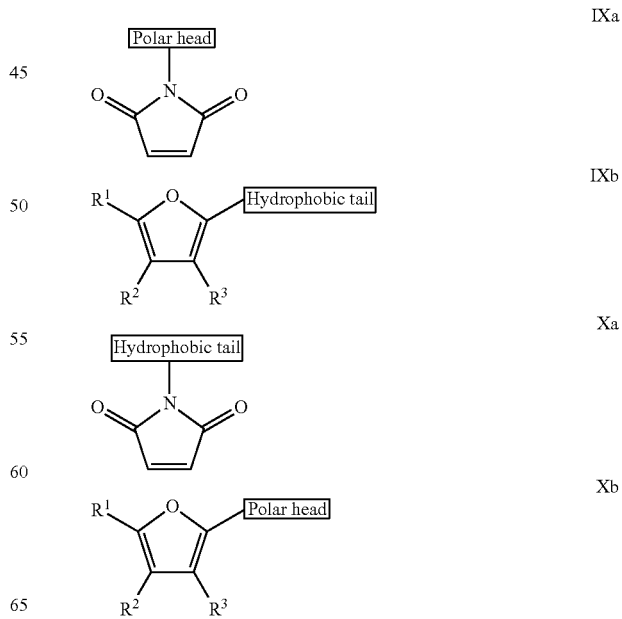

By "group compatible with the conditions of a Diels-Alder reaction", it is meant a group which does not prevent the Diels-Alder reaction forming the surfactant Ix or X to take place, starting from the substituted furane precursor IXb or Xb bearing said group. A wide variety of functional groups are tolerated by the Diels-Alder reaction, as well known to those skilled in the art.

Surfactants IX and X incorporate a Diels-Alder adduct as the weak chemical link, which cleavage can be thermally induced upon simple moderate heating, generally at 60-100° C., leading to distinct hydrophilic and hydrophobic fragments which exhibit no surface-active behavior. This process is irreversible, since the surfactant molecule is not formed again when the temperature is lowered to ambient conditions.

More preferred compounds Ix and X are compounds of formula XI:

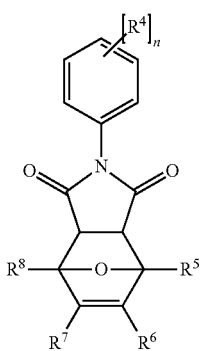

XI in which $R^5$, $R^6$, $R^7$ and $R^8$ independently represent H, aryl, alkyl, halogen, or any other group compatible with the conditions of a Diels-Alder cycloaddition reaction, with the proviso that at least one of $R^5$, $R^6$, $R^7$ and $R^8$ is an alkyl group of formula $C_mH_{2m+1}$, wherein m is an integer ranging from 6 to 24, preferably from 6 to 18, the $R^4$ groups independently represent hydrophilic groups such as described hereinbefore, for example an anionic group with a suitable cation, a cationic group with a suitable anion, or a polyethylene glycol group, and n is an integer ranging from 1 to 5, preferably from 1 to 2. Most preferred compounds of formula XI are those in which $R^6=R^7=R^8=H$, $R^5$ is an alkyl group of formula $C_mH_{2m+1}$, wherein m is an integer ranging from 6 to 24, preferably from 6 to 18, n=1 and $R^4$ is a meta or para substituent, preferably para, selected from anionic groups with a suitable cation, preferably $CO_2^-M^+$, $SO_3M^+$ or $O^-M^+$, wherein M is a cation, preferably an alkali metal cation, such as $Na^+$ or $K^+$. Specific examples of surfactants XI are exo-4-dodecyl-7-oxabicyclo[2.2.1]hept-5-ene-2,3-dicarboxy-N-(4-sodiumsulfonate)imide ($R^6=R^7=R^8=H$, $R^5=n-C_{12}H_{25}$, $R^4=para-SO_3Na$), exo-4-dodecyl-7-oxabicyclo[2.2.1]hept-5-ene-2,3-dicarboxy-N-(4-sodiumcarboxylate)imide ($R^6=R^7=R^8=H$, $R^5=n-C_{12}H_{25}$, $R^4=para-CO_2Na$) and exo-4-dodecyl-7-oxabicyclo[2.2.1]hept-5-ene-2,3-dicarboxy-N-(4-sodiumphenolate)imide ($R^6=R^7=R^8=H$, $R^5=n-C_{12}H_{25}$, $R^4=para-ONa$). These surfactants are stable in aqueous solutions and possess good wetting characteristics.

Certain surfactants IX and X are available from Sandia National Laboratories, or can be synthesized from functionalized furane and maleimide starting materials (which are also the cleavage products) such as disclosed in U.S. Pat. No. 7,022,861 or U.S. Pat. No. 7,331,837. The functionalized furane and maleimide starting materials, such as 2-alkyl-furans, can themselves be obtained from readily available commercial products, including furane, succinic anhydride and suitably substituted primary amines, using synthetic routes well known to the person skilled in the art.

Other examples of heat sensitive surfactants which may be cleaved through a retro Diels-Alder reaction are the "Gemini" Diels-Alder surfactants obtainable according to the method disclosed in U.S. Pat. No. 7,022,861, composed of two surfactant molecules attached to a bismaleimide such as those disclosed in U.S. Pat. No. 6,825,315, U.S. Pat. No. 6,337,384, U.S. Pat. No. 6,271,335 and U.S. Pat. No. 6,403,753 or a bisfuran, wherein the surfactant molecule comprises, for example, a non-polar branched or unbranched alkyl group linked to an ionic polar group, as the head group, such as a quaternary ammonium group.

Other thermally cleavable surfactants which may be useful in the first curable coating compositions according to the invention are those having a polar head which spontaneously degrades upon heating, yielding a non-surface-active hydrophobic fragment. Examples of those surfactants are the compounds such as described in "Thermally and Photochemically Cleavable Surfactants," 231st National ACS Meeting, Atlanta, Ga., March 2006 (cited above), comprising a thiirane oxide polar head which undergoes thermal decomposition at temperatures of about 90-100° C., or a sulfolene (piperylene sulfone) polar head. An example is n-octylthiirane oxide, which loses all surface-active behavior when decomposed into 1-decene and sulfur monoxide. Sulfolene groups release a substituted 1,3-butadiene derivative and sulfur dioxide upon decomposition.

Other useful thermally cleavable surfactants are amine oxide containing surfactants, which decompose at temperatures above 100° C. (see Hayashi, Y., et al., *J. Am. Oil Chemists Soc.* 1985, 62, 555).

Photo-cleavable surfactants have the property to be photo-responsive when irradiated, e.g. with UV light, resulting in changes in surface-active behavior with or without surfactant fragmentation.

Examples of surfactants incorporating UV sensitive moieties are alkylarylketone sulfonates and diazosulfonates which degrade upon irradiation (see Epstein, W. W., et al., *Anal. Biochem.* 1982, 119, 304; and Nuyken, O., et al., *J. Photochem. Photobiol. A Chem.* 1995, 85, 291), or surfactants comprising a 3-(2-hydroxy-phenyl)-acrylate or 3-(2-amino-phenyl)-acrylate linker, such as disclosed in WO 02/097393. Some surfactants having a thiirane oxide polar head adjacent to an aromatic cycle have also been reported to cleave in "Thermally and Photochemically Cleavable Surfactants," 231st National ACS Meeting, Atlanta, Ga., March 2006 cited above.

Other useful cleavable surfactants are sulfate or sulfonate surfactants comprising long hydrocarbon chains such as sodium dodecyl sulfate (called hereafter SDS)

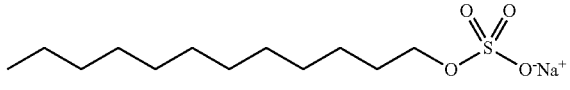

or sodium dodecyl benzene sulfonate (called hereafter SDBS)

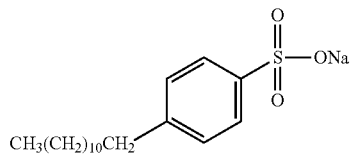

These surfactants may be cleaved by hydrolysis, especially under alkaline conditions, by heating.

The cleavable surfactant is comprised in the first coating composition in usual amounts, generally from 0.01 to 1%, preferably from 0.01 to 0.5% by weight, relative to the total weight of said composition. Preferably, the first curable coating composition contains no surfactant which is not cleavable under the meaning of the invention.

After the first curable composition has been deposited onto the exposed surface of the substrate, and before step (d), said optical article is subjected to a treatment step resulting in a cleavage of at least a portion of the cleavable surfactant. By cleaving at least a portion of the surfactant, the ability of the first coating to adhere to the second coating is greatly improved. Preferably, the whole surfactant is cleaved.

Cleavage of cleavable surfactants is well documented in the literature. Practically, the nature of the treatment resulting in a cleavage of at least a portion of the cleavable surfactant and parameters such as cleavage time required to successfully implement the process of the invention can be easily determined by the person skilled in the art. The cleavage treatment should be chosen so as to not severely alter the properties of the substrate or any coating which has already been deposited onto said substrate.

One of ordinary skill in the art will be able to determine the appropriate cleavable surfactant for the desired application. For example, in the case of heat sensitive materials, a photocleavable surfactant may be preferred.

The present process is used to control surface energy of a first coating to be coated with a second coating. Preferably, the cleavage step, optionally followed by a washing step, increases the surface energy of the first coating up to a level which is at least as high as the surface energy level which would have been obtained if no surfactant had been present in the first curable coating composition.

Generally, the increase of surface energy resulting from the cleavage step is at least 10 mJ/m$^2$, more preferably at least 15 mJ/m$^2$.

It is preferred that the process of the invention allows to obtain a first coating having a surface energy of at least 50 mJ/m$^2$, preferably of at least 55 mJ/m$^2$ after the cleavage step. The treatment time, which notably depends on the nature of the cleavable surfactant, may be varied so as to reach such surface energy.

The surface energy values referred above are calculated according to Owens Wendt method, described in the following document: Owens, D. K.; Wendt, R. G.

"Estimation of the surface force energy of polymers", *J. Appl. Polym. Sci.* 1969, 51, 1741-1747.

Cleavage may be performed at any time after step (b) of the process according to the invention, but has to be performed before deposition step (d) of the second coating. In particular, cleavage of the surfactant may occur during curing step (c) of the first curable composition. Cleavage of the surfactant and curing of the first curable composition can be performed at the same time, even though they involve treatments of different nature. In the case when the cleavable surfactant is not or not sufficiently cleaved following step (c) of the inventive process, a specific cleavage step has to be performed. It is worth noting that the cleavage step of the surfactant may also cause curing of the first curable composition to occur at least partially, for example when said surfactant is heat-cleavable and said composition is heat-curable.

Heat cleavable surfactants are preferably cleaved at a temperature ranging from 50 to 150° C., more preferably from 60 to 130° C., even better from 80 to 120° C. and still better from 80 to 110° C. The heating methods disclosed above may be used for the thermal curing step.

If cleavage of at least a portion of the surfactant had not been performed before formation step (d), adhesion problems might have been encountered, especially in the case when the surface of the first coating had not been treated with energetic species.

Generally, no treatment for eliminating the cleavage products from the first coating is performed before deposition of the second coating.

However, according to one embodiment of the invention, an adhesion improvement surface treatment such as a washing step and/or an activation treatment of the surface of the first coating is performed before step (d), which may result in a removal of at least part of said cleavage products from the surface of the first coating. Said optional washing step or activation treatment is generally a liquid phase treatment with deionized water, a polar solvent or a dilute alkaline or acid solution. For example, if one of the cleavage products is an acid, it can be removed from the surface of the coating by washing with an appropriate alkaline solution. Volatile cleavage products can be easily removed by heating or drawn off under vacuum. For example, aliphatic groups such as hexane may yield under certain cleavage conditions hexanol or hexene which are readily removable. In some embodiments, the cleavage products have the advantage to be gaseous.

The adhesion improvement treatment of the first coating surface may also comprise a deposition step of an adhesion promoter layer onto the first coating. Said layer is formed from an adhesion promoter composition, which may be deposited onto the first coating by any appropriate method, preferably by spin coating or dip coating. The adhesion promoter composition may comprise the following polymers or copolymers: polyester, polyurethane, polyamide, polycarbonate; or the following monomers: acrylates or methacrylates such as glycidyl acrylate, butadiene based monomers, vinyl halides, maleic anhydride based monomers; or at least one silane or siloxane, or hydrolyzates thereof; or mixtures thereof.

Aminosilanes adhesion promoters are organosilanes comprising at least one amine group, preferably NH or $NH_2$, and which is preferably capable of interacting with the first coating. Said aminosilane may also comprise other functional groups.

The adhesion promoter is preferably an alkoxysilane bearing at least one amine group, more preferably a trialkoxysilane bearing at least one amine group. Non limiting examples of aminosilanes are primary aminoalkyl silanes, secondary aminoalkyl silanes and bis-silylalkyl amines, in particular 3-aminopropyltrimethoxysilane, 3-aminopropyltriethoxysilane, bis-trimethoxysilylpropylamine, N-β-(aminoethyl)-γ-aminopropyltrimethoxysilane ($H_2NCH_2CH_2NHCH_2CH_2CH_2Si(OCH_3)_3$), and the triaminofunctional compound of formula $H_2NCH_2CH_2NHCH_2CH_2NHCH_2CH_2CH_2Si(OCH_3)_3$, which are all commercially available. Obviously, analogues of these silanes, such as ethoxy analogues, can also be used. The amount of adhesion promoter to be used in the adhesion promoter composition can be easily determined by those skilled in the art with a minimum routine experimentation.

A combination of the above cited washing, activation treatments, and adhesion promoter deposition can also be performed.

An important advantage of the inventive process is that subjecting the surface of the first coating to a treatment intended to increase adhesion to the second coating, such as a corona treatment or a vacuum plasma treatment, is not necessary. According to a highly preferred embodiment of the invention, no additional surface treatment with energetic species, intended to increase adhesion of the first coating to the second coating, is performed on the first coating before proceeding to step (d) of the inventive process.

In another embodiment of the invention, no additional surface treatment of the first coating is performed before proceeding to step (d) of the inventive process.

By energetic species, it is meant species with an energy ranging from 1 to 150 eV, preferably from 10 to 150 eV, and more preferably from 40 to 150 eV. Energetic species may be chemical species such as ions, radicals, or species such as photons or electrons.

Examples of treatments with energetic species are, without limitation: a vacuum plasma treatment, an atmospheric pressure plasma treatment, a glow discharge plasma treatment, a corona discharge treatment, an ion beam bombardment, in particular with an ion gun, or an electron beam bombardment.

When the first coating has been at least partially cured and at least a portion of the cleavable surfactant contained in said coating has been cleaved, the formation step (d) of the second coating can be implemented. As used herein, the "second coating" is the coating which is deposited onto the at least partially cured first coating having at least a portion of its cleavable surfactant which has been cleaved.

Said second coating may be deposited, depending upon its nature, by liquid phase deposition such as dip, spin, spray, flow or brush coating, or vapor phase deposition, such as physical vapor deposition (PVD) or chemical vapor deposition (CVD), including evaporative deposition, ion beam-assisted evaporative deposition, sputter deposition, electron beam PVD, plasma-enhanced CVD.

The nature of the second coating to be directly deposited onto the first coating is not particularly limited. It can be any functional layer commonly used in the field of optics, e.g. an organic or mineral layer. In particular, it may be, without limitation, an anti-smudge top coat, a layer of an antireflection coating, a polarized coating, a photochromic coating, an antistatic coating, or any other functional coating. It may also be an abrasion- and/or scratch-resistant coating even though the first coating is an abrasion- and/or scratch-resistant coating, thus giving rise to a bi-layer abrasion- and/or scratch-resistant coating.

As a result of forming the second coating onto the first coating in step (d), an optical article is obtained, wherein said first coating adheres to said second coating. Successful implementation of the inventive process can be easily checked, for example by carrying out the classical cross-hatch tape peel adhesion tests. In the experimental part, adhesion of an anti-smudge top coat to a hard coated optical article was checked by comparing the hydrophobic properties of the surface of said optical article before and after a rubbing operation was performed.

It is possible to apply other coatings onto the second coating. Actually, it is usual practice to coat at least one main surface of a lens substrate with successively, starting from the surface of the lens substrate, an impact-resistant coating, an abrasion- and/or scratch-resistant coating (hard coat), an antireflection coating and an anti-smudge top coat. Other coatings such as a polarized coating, a photochromic coating, a tinted coating or an adhesive layer, for example an adhesive polyurethane layer, may also be applied onto one or both surfaces of the lens substrate.

In one embodiment of the invention, at least one main surface of the lens substrate obtained by the present process is successively coated with, starting from the surface of the lens substrate, an impact-resistant coating, an abrasion- and/or scratch-resistant coating, an antireflection coating and an anti-smudge top coat, wherein at least one of the abrasion-and/or scratch-resistant coating and the antireflection coating have been formed according to the teachings of the invention (i.e. from at least one curable composition comprising a cleavable surfactant which has been subsequently cleaved at the right time). An antireflection coating is considered to have been formed according to the teachings of the invention when it comprises at least one AR layer formed and subsequently coated according to the inventive process.

In another embodiment of the invention, at least one main surface of the lens substrate is successively coated with, starting from the surface of the lens substrate, an abrasion- and/or scratch-resistant coating, an antireflection coating and an anti-smudge top coat, wherein at least one of the abrasion-and/or scratch-resistant coating and the antireflection coating have been formed according to the teachings of the invention.

According to the invention, the optical article which may be obtained by the inventive process may comprise a substrate coated with an impact-resistant primer coating.

The impact-resistant coating which may be used in the present invention can be any coating typically used for improving impact resistance of a finished optical article. Also, this coating generally enhances adhesion, if present, of the abrasion and/or scratch-resistant coating on the substrate of the finished optical article. By definition, an impact-resistant primer coating is a coating which improves the impact resistance of the finished optical article as compared with the same optical article but without the impact-resistant primer coating.

Typical impact-resistance primer coatings are (meth) acrylic based coatings and polyurethane based coatings. (Meth)acrylic based impact-resistant coatings are, among others, disclosed in U.S. Pat. Nos. 5,015,523 and 6,503,631 whereas thermoplastic and cross-linked based polyurethane resin coatings are disclosed inter alia, in Japanese Pat. Nos. 63-141001 and 63-87223, EP Pat. No. 0404111 and U.S. Pat. No. 5,316,791.

In particular, the impact-resistant primer coating according to the invention can be made from a latex composition such as a poly(meth)acrylic latex, a polyurethane latex or a polyester latex.

Among the preferred (meth)acrylic based impact-resistant primer coating compositions there can be cited polyethylene glycol(meth)acrylate based compositions such as, for example, tetraethylene glycoldiacrylate, polyethylene glycol (200) diacrylate, polyethylene glycol (400)diacrylate, polyethylene glycol (600) di(meth)acrylate, as well as urethane (meth)acrylates and mixtures thereof.

Preferably, the impact-resistant primer coating has a glass transition temperature (Tg) of less than 30° C. Among the preferred impact-resistant primer coating compositions, there may be cited the acrylic latex commercialized under the name Acrylic latex A-639 by Zeneca and polyurethane latexes commercialized under the names Witcobond® 240 and Witcobond® 234 by Baxenden Chemicals.

In a preferred embodiment, the impact-resistant primer coating may also include an effective amount of a coupling agent in order to promote adhesion of the primer coating to the optical substrate and/or to the scratch-resistant coating or any other coating. A non limitative example of a coupling agent is a pre-condensed solution of an epoxyalkoxysilane and an unsaturated alkoxysilane, preferably comprising a terminal ethylenic double bond. Such compounds have been described in the present disclosure.

The impact-resistant primer coating composition can be applied onto the underlying coating or substrate using any classical method such as spin, dip, or flow coating.

The impact-resistant primer coating composition can be simply dried or optionally pre-cured before application of a subsequent coating. Depending upon the nature of the impact-resistant primer coating composition, thermal curing, UV-curing or a combination of both can be used.

Thickness of the impact-resistant primer coating, after curing, typically ranges from 0.05 to 30 µm, preferably 0.5 to 20 µm, more particularly from 0.6 to 15 µm, better 0.6 to 5 µm and even better from 0.7 to 1.2 µm.

The abrasion- and/or scratch-resistant coating which is generally deposited onto the impact resistant coating, or which is deposited onto a first abrasion- and/or scratch-resistant coating to form a bi-layer abrasion- and/or scratch-resistant coating, can be formed according to the embodiments which have been described previously, or can be any classical abrasion- and/or scratch-resistant coating, such as those described in US 2006/219347 in the name of the applicant.

The AR coating, when present, is preferably formed onto an abrasion- and/or scratch-resistant coating. Said AR coating can be formed according to the embodiments which have been described previously, or can be any classical AR coating known in the art such as a classical sol/gel AR coating or a vapor phase deposited AR coating. The latter will now be described.

Antireflection coatings and their methods of making are well known in the art. The antireflection coating can be any layer or stack of layers which improves the antireflective properties of the finished optical article over at least one portion of the visible spectrum. The antireflection coating may be a mono- or multilayered antireflection coating, and preferably comprises a mono- or multilayered film of dielectric materials.

Although the antireflection coating preferably comprises an alternated stack of low refractive index (LI) and high refractive index (HI) layers, in another embodiment of the invention, LI and HI layers are not necessarily alternated in the AR coating.

As used herein, a low refractive index layer is intended to mean a layer with a refractive index of 1.55 or less, preferably lower than 1.50 and even better lower than 1.45, and a high refractive index layer is intended to mean a layer with a refractive index higher than 1.55, preferably higher than 1.6, more preferably higher than 1.8 and even better higher than 2, both at a reference wavelength of 550 nm. Unless otherwise noted, all refractive indexes indicated in the present patent application are expressed at 25° C. and $\lambda=550$ nm.

HI layers are classical high refractive index layers and may comprise, without limitation, one or more mineral oxides such as $TiO_2$, $PrTiO_3$, $LaTiO_3$, $ZrO_2$, $Ta_2O_5$, $Y_2O_3$, $Ce_2O_3$, $La_2O_3$, $Dy_2O_5$, $Nd_2O_5$, $HfO_2$, $Sc_2O_3$, $Pr_2O_3$ or $Al_2O_3$, or $Si_3N_4$, as well as mixtures thereof, preferably $TiO_2$ or $PrTiO_3$.

LI layers are also well known and may comprise, without limitation, $SiO_2$, $MgF_2$, $ZrF_4$, $AlF_3$, chiolite ($Na_5Al_3F_{14}$), cryolite ($Na_3[AlF_6]$), or mixtures thereof, preferably $SiO_2$ or $SiO_2$ doped with $Al_2O_3$.

Generally, HI layers have a physical thickness ranging from 10 to 120 nm, and LI layers have a physical thickness ranging from 10 to 100 nm.

Preferably, the total physical thickness of the antireflection coating is lower than 1 micrometer, more preferably lower than or equal to 500 nm and even better lower than or equal to 250 nm. The total physical thickness of the antireflection coating is generally higher than 100 nm, preferably higher than 150 nm.

An antireflection stack of dielectric materials can be applied by vacuum deposition according to one of the following techniques: i) by evaporation, optionally assisted by ion beam; ii) by ion-beam spraying; iii) by cathodic sputtering; iv) by chemical vapor deposition assisted by plasma.

In the case of a single layer film, its optical thickness is preferably equal to $\lambda/4$, where $\lambda$ is a wavelength of 450 to 650 nm.

In the case of a multilayer film comprising three layers, a combination may be used corresponding to the respective optical thicknesses $\lambda/4$, $\lambda/2$, $\lambda/4$ or $\lambda/4$, $\lambda/4$, $\lambda/4$.

It is also possible to use an equivalent film formed by more layers, in the place of any number of the layers which are part of the above three layers.

Preferably, the antireflection coating is a multilayer film comprising three or more dielectric material layers of alternatively high and low refractive indexes.

A preferred antireflection coating may comprises a stack of four layers formed by vacuum deposition, for example a first $SiO_2$ layer having an optical thickness of about 100 to 160 nm, a second $ZrO_2$ layer having an optical thickness of about 120 to 190 nm, a third $SiO_2$ layer having an optical thickness of about 20 to 40 nm and a fourth $ZrO_2$ layer having an optical thickness of about 35 to 75 nm.

A layer of an anti-smudge top coat may be used in the present invention. It is generally deposited onto an AR coating, but it may also be deposited onto an abrasion- and/or scratch-resistant coating.

The anti-smudge top coat is defined as a hydrophobic and/or oleophobic surface coating, wherein the stationary contact angle to deionized water is at least 75°, preferably at least 90°, and more preferably more than 100°. The stationary contact angle is determined according to the liquid drop method in which a water drop having a diameter smaller than 2 mm is formed on the optical article and the contact angle is measured. It corresponds to the angle at which the surface of the water drop meets the surface of the optical article.

The ones preferably used in this invention are low surface energy top coat, i.e. those which reduce surface energy of the article to less than 20 mJ/m². The invention has a particular interest when using anti-smudge top coats having a surface energy of less than 14 mJ/m² and even better less than 12 mJ/m².

The anti-smudge top coat according to the invention is preferably of organic nature. By organic nature, it is meant a layer which is comprised of at least 40% by weight, preferably at least 50% by weight of organic materials, relative to the total weight of the coating layer. A preferred anti-smudge top coat is made from a liquid coating material comprising at least one fluorinated compound.

Hydrophobic and/or oleophobic surface coatings most often comprise silane-based compounds bearing fluorinated groups, in particular perfluorocarbon or perfluoropolyether group(s). By way of example, silazane, polysilazane or silicone compounds are to be mentioned, comprising one or more fluorine-containing groups such as those mentioned here above. Such compounds have been widely disclosed in the previous art, for example in U.S. Pat. No. 4,410,563, U.S.

Pat. No. 6,183,872, U.S. Pat. No. 6,277,485, EP 0203730, EP 749021, EP 844265 and EP 933377.

A classical method to form an anti-smudge top coat consists in depositing compounds bearing fluorinated groups and Si—R groups, R representing an —OH group or a precursor thereof, such as —Cl, —NH$_2$, —NH— or —O-alkyl, preferably an alkoxy group. Such compounds may perform, at the surface onto which they are deposited, directly or after hydrolysis, polymerization and/or cross-linking reactions with pendent reactive groups.

Preferred fluorinated compounds are silanes and silazanes bearing at least one group selected from fluorinated hydrocarbons, perfluorocarbons, fluorinated polyethers such as $F_3C$—$(OC_3F_6)_{24}$—O—$(CF_2)_2$—$(CH_2)_2$—O—$CH_2$—Si$(OCH_3)_3$ and perfluoropolyethers, in particular perfluoropolyethers.

Commercial compositions for making anti-smudge top coats are the compositions KY130 and KP 801M commercialized by Shin-Etsu Chemical and the composition OPTOOL DSX (a fluorine-based resin comprising perfluoropropylene moieties) commercialized by Daikin Industries. OPTOOL DSX is the most preferred coating material for anti-smudge top coats.

The liquid coating material for forming the anti-smudge top coat of the invention may comprise one or more of the above cited compounds. Preferably, such compounds or mixtures of compounds are liquid or can be rendered liquid by heating, thus being in a suitable state for deposition.

The deposition techniques for anti-smudge top coats are very diverse, including liquid phase deposition such as dip coating, spin coating, spray coating, or vapor phase deposition (vacuum evaporation). Of which, deposition by spin or dip coating is preferred.

The invention also relates to an optical article comprising a substrate having a surface coated with an at least partially cured coating, wherein said coating has been obtained by:

depositing onto the surface of the substrate a first curable composition comprising at least one cleavable surfactant, and at least partially curing said curable composition, and wherein said optical article has been subjected to a treatment step resulting in a cleavage of at least a portion of the cleavable surfactant after said curable composition has been deposited onto the surface of the substrate.

The above surface-modified optical article is generally an intermediate product obtained during the implementation of the inventive process. It is generally intended to be coated with at least one more coating. It is clearly distinguishable from corresponding intermediate products formed by prior art processes using non cleavable surfactants. Its surface properties have been optimized to allow an excellent adhesion of the subsequent coating, without the need to perform a surface preparation treatment, as previously explained. Usual surface analytical methods can be used to reveal the presence of the cleaved surfactant within said first coating and at its surface.

Generally, after the cleavage step and a washing step with a polar solvent, the surface energy of said first coating is preferably increased to a level of at least 50 mJ/m$^2$, as previously exposed.

Generally, the increase of surface energy resulting from the cleavage step is at least 10 mJ/m$^2$, more preferably at least 15 mJ/m$^2$.

Without wishing to be bound by theory, it is envisioned that the increase of the surface energy stems from the removal of the hydrophobic tail of the surfactant, which may be discarded by the washing step, or from its destruction by the cleavage step.

The invention further relates to a curable composition comprising at least one cleavable surfactant, preferably a cleavable surfactant of formula IX or X, more preferably of formula XI, even better of formula XI with $R^6$=$R^7$=$R^8$=H, $R^5$=n-$C_{12}H_{25}$ and $R^4$=para-$SO_3Na$, and at least one compound of formula I, preferably at least one compound of formula II. Those compounds have been described previously. This curable coating composition is especially devised to carry out the inventive process and may give rise to "first coatings" with the meaning used herein. However, it could also be used as a traditional surfactant containing coating composition.

The use of compositions comprising a cleavable surfactant of formula IX or X, preferably of formula XI, and most preferably of formula XI with $R^6$=$R^7$=$R^8$=H, $R^5$=n-$C_{12}H_{25}$ and $R^4$=para-$SO_3Na$, allows to obtain a first coating which may have, before cleavage of the cleavable surfactant, a slightly higher (around 2 to 3 mJ/m$^2$) surface energy than the same composition which would use a classical surfactant. Generally, the surface energy of the first coating formed from such compositions is of at least 50 mJ/m$^2$ before the cleavage step.

Finally, the invention relates to the use of a cleavable surfactant in a curable coating composition to improve adhesion of the resulting cured coating to another coating.

All the embodiments of the process according to the invention, which have been described hereinbefore, also apply to the above optical article, curable composition and use.

Now, the present invention will be described in more detail with reference to the following examples. These examples are provided only for illustrating the present invention and should not be construed as limiting the scope and spirit of the present invention.

EXAMPLES

1. Testing Methods a) Rubbing Test

The contact angle of DI water is measured on the surface of the lens with a contact angle measurement device DSA100 manufactured by Kruss. The lens is then submitted to a number of rubbing cycles. One cycle is a back and forth motion of a wet cloth (damp with deionized water) at the surface of a lens with a predefined weight (between 500 g and 4000 g). After N cycles the water contact angle is measured again. The greater the decrease of the water contact angle, the lower the adhesion of the top coat layer on the surface of the lens.

b) Dry Adhesion Test

Dry adhesion of the transferred coatings was measured using the cross-hatch adhesion test according to ASTM D3359-93, by cutting through the coatings a series of 5 lines, spaced 1 mm apart with a razor, followed by a second series of 5 lines, spaced 1 mm apart, at right angles to the first series, forming a crosshatch pattern comprising 25 squares. After blowing off the crosshatch pattern with an air stream to remove any dust formed during scribing, clear cellophane tape (3M SCOTCH® n° 600) was then applied over the crosshatch pattern, pressed down firmly, and then rapidly pulled away from coating in a direction perpendicular to the coating surface. Application and removal of fresh tape was then repeated two additional times. Adhesion is rated as follows (0 is the best adhesion, 1-4 is in the middle, and 5 is the poorest adhesion):

TABLE 1

| Adhesion score | Squares removed | Area % left intact |
| --- | --- | --- |
| 0 | 0 | 100 |
| 1 | <1 | >96 |
| 2 | 1 to 4 | 96-84 |
| 3 | >4 to 9 | 83-64 |
| 4 | >9 to 16 | 63-36 |
| 5 | >16 | <36 | c) Cleanability Test

This test was carried out on lenses coated with an anti-smudge top coat.

The cleanability test consists in depositing about 50 micrograms of dirt in the form of a 20 mm stain (this is an artificial stain, comprising mostly oleic acid) on the convex surface of the lens and to carry out reproducible wiping with a back and forth movement (one back and forth movement corresponding by definition to two wipes) with a cotton cloth (made by Berkshire) under a load of 750 g.

The total amplitude when the cloth moved on the lens was 40 mm, i.e. 20 mm on each side of a point centered on the stain. After each wiping cycle, the scattering value of the lens was measured. The scattering measurement was carried out with a Hazeguard XL 211 Plus device.

Then the number of wipes needed to create a scattering level of the lens lower than or equal to 0.5% was determined. The wiping cycle was as follows:

| CYCLE | NUMBER OF WIPES |
| --- | --- |
| 1 | 2 |
| 2 | 10 |
| 3 | 20 |
| 4 | 40 |
| 5 | 70 |
| 6 | 100 |
| 7 | 150 |
| 8 | 200 |

When performing the cycle n+1 after the scattering measurement, the same cloth was used, disposed in the same way as during the cycle n.

The number of wipes to obtain a scattering value was determined by the calculation, using the number of wipes around the value 0.5% and the real values of diffusion obtained.

H0: initial scattering value of the lens; H1: Scattering value corresponding to NS1;

NS1: Maximum number of wipes leading to scattering of over 0.5%;

NS2: Maximum number of wipes leading to scattering of less than 0.5%

H2: Scattering value corresponding to NS2;

Number of wipes=NS1+[[(H1−H0)−0.5]×[(NS2−NS1)/((H1−H0)−(H2−H0))]].

The cleanability score is the natural logarithm of the number of wipes: Ln (number of wipes). The lower the score is, the better the cleanability is.

d) Measuring the Static Contact Angle with Water

This measurement was carried out by automatic acquisition and by image analysis of the contact angle of a drop of water deposited on the surface of a flat or curved lens with the purpose of evaluating the hydrophobic performance of said lens.

The measurement was carried out on a DSA100 (prop Shape Analysis System) Kruss device linked to a Windows PC. The volume of the formed drop was 4 µL. The conductivity of the water was comprised between 0.3 µS and 1 µS at 25° C. The temperature of the room was maintained at 23+1-5° C.

2. Experimental Details

The optical articles used in the examples 1 to 6 and 8 to 11 were semi-finished ORMA® 4.50 base round lenses surfaced to a power of −2.00 diopters and a diameter of 70 mm. ORMA® is a registered trade mark of Essilor. This substrate is obtained by polymerizing a diethylene glycol bis(allyl carbonate) monomer, typically CR-39®.

The optical article in example 7 is a PC lens.

The lenses were spin-coated on their concave side with two different kinds of coatings which are polysiloxane-type abrasion- and scratch-resistant coatings ("Hard coat 1 and hard coat 2"; thickness: 1.8 µm and around 3 µm Hard coat 1 (HC1) is obtained by curing a HC1 liquid coating composition comprising two main components GLYMO hydrolyzate and colloidal silica with Al(Acac)$_3$, as catalyst and organic solvents.

HC1 is used as such (with no surfactant) or with one of the 4 surfactants cited hereafter (0.1 parts by weight for surfactant EFKA3034 or compound XII or 0.11% by weight of SDS or SDBS).

Hard coat 2 (HC2) is obtained by curing a HC2 liquid curable composition comprising GLYMO (224 parts by weight), DMDES (120 parts by weight), 0.1 N HCl (80.5 parts by weight), colloidal SiO$_2$ (718 parts by weight, containing 30% by weight of nanoparticles in methanol), Al(AcAc)$_3$ (15 parts by weight) as a curing catalyst, a surfactant (0.1% by weight of compound XII or EFKA® 3034, or 0.11% of SDS or SDBS as detailed below) and ethylcellosolve (44 parts by weight).

4 surfactants were used: exo-4-dodecyl-7-oxabicyclo[2.2.1]hept-5-ene-2,3-dicarboxy-N-(4-sodiumsulfonate) imide (called cleavable surfactant XII), supplied by Sandia National Laboratories, which is a thermally cleavable surfactant of formula XI, wherein $R^6=R^7=R^5=H$, $R^5=n-C_{12}H_{25}$ and $R^4$=para-SO$_3$Na), EFKA® 3034 from Ciba Specialty Chemicals, which is a fluorocarbon containing modified polysiloxane employed for comparative experiments only, cleavable sulfate and sulfonate surfactants SDS and SDBS as previously defined, supplied by Aldrich.

The liquid HC1 and HC2 compositions with or without surfactant are cured in a thermal oven at 110° C. during 3 hours (Examples 1 to 5) (this step also contributes to cleavage of the surfactant, in the case when cleavable surfactant XII is used) and let cooled down overnight. The surface of the deposited hard coat was then successively washed with soap, warm water and deionised water, except in examples 8-11 where no cleaning was performed.

For hard coat compositions containing surfactants SDS and SDBS, a short caustic treatment is implemented in order to cleave the molecules and comprises two steps: 1°) 10 seconds dip in an aqueous NaOH solution at 3.8 N at 71° C.), 2° hand wash with soap, then rinse with deionized water.

Then the thermally heated hard coat first coatings or the coatings cleaved by the caustic treatment were then coated with various second coatings (the coatings and the adhesion results are mentioned in tables 1 and 4 hereafter). In examples 1-4 and 12-14, the second coating was another thermally cured hard coat formed from liquid curable compositions HC1 or HC2 comprising either no surfactant (HC1/without surfactant), or surfactant EFKA® 3034 (HC1/EFKA® 3034) or surfactant XII (HC2/XII), the remaining ingredients being the same as those of the first deposited hard coat. These hard coats are cured for 3 hours at 110° C. In example 5, an impact resistant coating was deposited by spin coating onto the hard coat HC2/XII. Said impact resistant coating was formed by curing for 1 hour at 90° C. a polyurethane latex containing polyester moieties (Witcobond® 234 from BAXENDEN CHEMICALS). Then, the same hard coat as the one already deposited on the substrate was formed on said impact resistant coating. In examples 6-11, the second coating was a fluorinated topcoat (Optool DSX®), which was applied by dip coating onto the abrasion- and scratch-resistant coating (speed: 22 mm/sec). The top coat was cured by infra red heating for 60 seconds, the temperature of the heating source being 150° C. (actual temperature of ceramic surface (IR unit)) (Target temperature of the lens 70° C.).

At the end of the thermal heating, the lens surface temperature has reached 70° C.

Examples 1-5

TABLE 1

| Example | First coating/ Surfactant | Second coating | Dry adhesion test |
|---|---|---|---|
| 1 (comparative) | Hard coat HC1/ EFKA ® 3034 | Hard coat HC1/ EFKA ® 3034 | 5 (**) |
| 2 | Hard coat HC1/ XII | Hard coat HC1/ EFKA ® 3034 | 0 |
| 3 | Hard coat HC1/ XII | Hard coat HC1/ without surfactant | 0 |
| 4 | Hard coat HC2/ XII | Hard coat HC2/ XII | 0 |
| 5 (*) | Hard coat HC2/ XII | Impact resistant coating: HC2/XII | 0 |

(*) A hard coat formed from a hard coat HC2 comprising surfactant XII was formed on the impact resistant coating.
(**) Very bad wetting, non uniform coating.

These results demonstrate that a coating formed according to the process of the invention is capable of being recoated without any surface treatment with energetic species or a concentrated alkaline solution, which is not the case when a non cleavable surfactant is used instead of a cleavable surfactant.

Cleavable surfactant XII exhibits a good miscibility in hard coating formulations and good wetting properties for hard coating formulations. Its flowing behavior is comparable to that of EFKA® 3034. As a comparison, the same hard coat formulation without surfactant exhibits an insufficient flow quality.

Examples 6 to 7

The durability and adhesion of the top coat have been checked through rubbing cycles and surface properties measurements.

TABLE 2

| | | Corona treatment | | Water contact angle of the final article | | |
|---|---|---|---|---|---|---|
| Example | First coating/ Surfactant | of the first coating | Second coating | Initial | After 4000 rubs | After 8000 rubs |
| 6 (***) | Hard coat1/ XII | No | Top coat | 119° | 97° | 90° |
| 7 (comparative) | Hard coat of TD2 ™ or Durable ™ PC lenses/ EFKA ® 3034 | No | Top coat | 108° | 74° | N/A (*) |

(*) N/A: The top coat is not present anymore.
(**) 1 pass, 6 mm/sec.
(***) The hard coat was cured at 110° C. instead of 120° C.

These results demonstrate that a very good adhesion of the top coat to the hard coat can be obtained thanks to the inventive process without corona treatment of said hard coat, which is not the case when a non cleavable surfactant (example 7) is used instead of a cleavable surfactant (example 6).

Without cleavable surfactant (example 7), the top coat does not stay on the hard coat after 8000 rubs.

These results demonstrate that surface treatment of the hard coat with an adhesion promoter layer before deposition of a second coating improves the cleanability of the optical article and slightly improves adhesion of the top coat to the hard coat.

Examples 8-11

TABLE 3

| | | | Cleanability score of the final article | | | Water contact angle of the final article | | |
|---|---|---|---|---|---|---|---|---|
| Example | First coating/ Surfactant | Second coating | Initial | After 4000 rubs | After 8000 rubs | Initial | After 4000 rubs | After 8000 rubs |
| 8 (*) (comparative) | Hard coat 1/ EFKA ® 3034 | Top coat | 4.8 | 5.3 | N/A | 101° | 68° | N/A |
| 9 (*) | Hard coat 1/XII | Top coat | 3.7 | 4.6 | 5.3 | 116° | 96° | 87° |
| 10 (**) (comparative) | Hard coat 1/ EFKA ® 3034 | Top coat | 4.7 | 6.0 | N/A | 116° | 60° | N/A |

TABLE 3-continued

|  | First coating/ Surfactant | Second coating | Cleanability score of the final article | | | Water contact angle of the final article | | |
|---|---|---|---|---|---|---|---|---|
| Example | | | Initial | After 4000 rubs | After 8000 rubs | Initial | After 4000 rubs | After 8000 rubs |
| 11 (**) | Hard coat 1/XII | Top coat | 3.7 | 3.8 | 4.4 | 117° | 111° | 104° |

(*) Time before testing: 24 hours.
(**) Time before testing: 1 month.

The above table shows that the properties of the optical article are improved with time: cleanability of the optical article and adhesion of the top coat to the hard coat are better after 1 month than after 24 hours.

Examples 12 to 15

In examples 12 to 14, a first coating has been applied and thermally cured in 2 steps: a first pre-curing at 75° C. during 15 minutes and a post-curing at 100° C. during 180 minutes.

For coatings containing SDS or SDBS, the thermal curing is followed by the caustic treatment.

Then a second coating is applied and cured in the same conditions as the first coating.

The surface energy (in $mJ/m^2$) was measured with a FTA 200 apparatus (measure according to the Owens-Wendt method using water and diiodomethane as reference liquids) at different stages:

The surface energy of the first coating is measured after curing and before any treatment;
The surface energy of the first coating is measured after the caustic treatment;
the surface energy of the first coating is measured after a sole hand wash test corresponding only to step 2) of the caustic treatment.

In example 15, only surface energy measurements on a first coating have been done. No second coating is applied.

The coatings and corresponding surface energy values are reported in table 4.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

All patents, patent applications and publications mentioned throughout the description are hereby expressly incorporated by reference in their entirety.

The invention claimed is:

1. A process for preparing an optical article, comprising:

(a) providing an optical article comprising a substrate having an exposed surface, (b) depositing onto said exposed surface of the substrate a first layer of a first curable composition comprising at least one cleavable surfactant, wherein the cleavable surfactant is selected from the group consisting of:

TABLE 4

| Example | First coating/ Surfactant | Second coating | Surface energy of first coating before any treatment | Surface energy of first coating after caustic treatment | Surface energy of first coating after hand wash | Dry Adhesion test of second coating |
|---|---|---|---|---|---|---|
| 12 (comparative) | Hard coat 1/ EFKA ® 3034 | Hard coat 1/ EFKA ® 3034 | 38.2 | 36.0 | 39.8 | 5 |
| 13 | Hard coat 1/SDS | Hard coat 1/ SDS | 57.2 | 77.0 | 56.4 | 0 |
| 14 | Hard coat 1/ SDBS | Hard coat 1/ SDBS | 52.0 | 72.3 | 50.9 | 0 |
| 15 (reference) | Hard coat 1/None | None | 53.5 | 58.4 | 54 | — |

(i) a compound of formula IX or X:

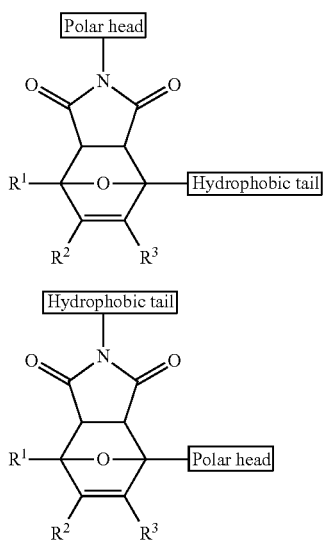

in which the polar head is a polar group, the hydrophobic tail is a hydrophobic group, R1, R2 and R3 independently represent H, aryl, alkyl, halogen, a hydrophobic tail or a polar head or any group compatible with the conditions of a Diels-Alder cycloaddition reaction;

(ii) a compound of formula XI:

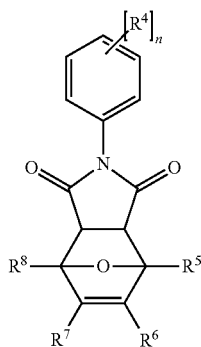

in which R5, R6, R7 and R8 independently represent H, aryl, alkyl, halogen, or any group compatible with the conditions of a Diels-Alder cycloaddition reaction, with the proviso that at least one of R5, R6, R7 and R8 is an alkyl group of formula CmH2m+1, wherein m is an integer ranging from 6 to 24, the R4 groups independently represent hydrophilic groups, and n is an integer ranging from 1 to 5; and (iii) sodium dodecyl sulfate, sodium dodecyl benzene sulfonate, or a mixture of both;

(c) curing at least partially said first curable composition, thereby forming a first coating, (d) forming a second coating onto said first coating, and (e) obtaining an optical article comprising a substrate successively coated with said first coating and said second coating, said first coating adhering to said second coating, wherein, after said first curable composition has been deposited onto the exposed surface of the substrate, and before step (d), said optical article is subjected to a treatment step resulting in a cleavage of at least a portion of the cleavable surfactant, and wherein no surface treatment with energetic species selected from ions, radicals, photons or electrons is performed on the first coating before proceeding to step (d).

2. The process of claim 1, wherein said first coating is a sol-gel coating or a (meth)acrylate based coating.

3. The process of claim 1, wherein the first curable composition further comprises at least one compound of formula:

$$R_nSi(X)_{4-n} \qquad (I)$$

or a hydrolyzate thereof, in which the R groups are identical or different and represent monovalent organic groups linked to the silicon atom through a carbon atom, the X groups are identical or different and represent hydrolyzable groups, and n is an integer equal to 1 or 2.

4. The process of claim 3, wherein the first curable composition does not comprise any surfactant that is not capable of being cleaved by said treatment step.

5. The process of claim 1, wherein the first curable composition further comprises at least one compound of formula:

$$R_{n'}Y_mSi(X)_{4-n'-m} \qquad (II)$$

or hydrolyzates thereof, in which the R groups are identical or different and represent monovalent organic groups linked to the silicon atom through a carbon atom, the Y groups are identical or different and represent monovalent organic groups linked to the silicon atom through a carbon atom and containing at least one epoxy function, the X groups are identical or different and represent hydrolysable groups, m and n' are integers such that m is equal to 1 or 2 and n'+m=1 or 2.

6. The process of claim 1, wherein the thickness of the first coating ranges from 1 to 15 μm.

7. The process of claim 1, wherein the thickness of the first coating ranges from 5 to 250 nm.

* * * * *